(12) United States Patent
Zhang et al.

(10) Patent No.: US 9,113,294 B2
(45) Date of Patent: Aug. 18, 2015

(54) METHOD FOR POSITIONING IP LOCATION AND SERVER

(71) Applicants: Tsinghua University, Beijing (CN); SHENZHEN TENCENT COMPUTER SYSTEMS COMPANY LIMITED, Shenzhen (CN)

(72) Inventors: Yaoxue Zhang, Beijing (CN); Yuezhi Zhou, Beijing (CN); Hao Liu, Beijing (CN); Chuan Chen, Shenzhen (CN); Juhong Wang, Shenzhen (CN)

(73) Assignees: TSINGHUA UNIVERSITY, Beijing (CN); SHENZHEN TENCENT COMPUTER SYSTEMS COMPANY LIMITED, Shenzhen (CN)

( * ) Notice: Subject to any disclaimer, the term of this patent is extended or adjusted under 35 U.S.C. 154(b) by 99 days.

(21) Appl. No.: 14/122,837

(22) PCT Filed: Jun. 6, 2013

(86) PCT No.: PCT/CN2013/076887
§ 371 (c)(1),
(2) Date: Nov. 27, 2013

(87) PCT Pub. No.: WO2014/161228
PCT Pub. Date: Oct. 9, 2014

(65) Prior Publication Data
US 2015/0201298 A1  Jul. 16, 2015

(30) Foreign Application Priority Data
Mar. 30, 2013  (CN) .......................... 2013 1 0108842

(51) Int. Cl.
*H04W 24/00* (2009.01)
*H04W 4/02* (2009.01)

(52) U.S. Cl.
CPC .................................... *H04W 4/02* (2013.01)

(58) Field of Classification Search
CPC ................... H04W 4/02; H04W 4/021–4/025; H04W 4/028; H04W 4/04–4/046
See application file for complete search history.

(56) References Cited

U.S. PATENT DOCUMENTS

| 2012/0083241 | A1* | 4/2012 | Annamalai et al. | 455/404.2 |
| 2013/0072221 | A1* | 3/2013 | Chen et al. | 455/456.1 |
| 2014/0080517 | A1* | 3/2014 | Martinez Olano et al. | 455/456.2 |

FOREIGN PATENT DOCUMENTS

| CN | 101355595 | 1/2009 |
| CN | 101742396 | 6/2010 |
| CN | 102307330 | 1/2012 |
| WO | 2006/096416 | 9/2006 |

* cited by examiner

*Primary Examiner* — San Htun
(74) *Attorney, Agent, or Firm* — Hodgson Russ LLP

(57) ABSTRACT

A method for positioning an IP location and a server are provided. The method comprises: obtaining location data of mobile terminals used by a plurality of users in a preset period to generate a first geographic location data set; pre-processing the first geographic location data set to obtain a second geographic location data set; obtaining a first selected location and a second selected location of each user according to the second geographic location data set; obtaining IP address data corresponding to fixed terminals used by the plurality of users to generate an IP address data set; pre-processing the IP address data set to obtain a plurality of IP sections; obtaining a plurality of first selected locations and second selected locations corresponding to the users of each IP section; and clustering the plurality of first selected locations and second selected locations to obtain the IP location of the IP section. The present disclosure achieves an IP positioning precision on a street level and has advantageous of simple arrangement and fast response speed.

9 Claims, 3 Drawing Sheets

METHOD FOR POSITIONING IP LOCATION AND SERVER

CROSS-REFERENCE TO RELATED APPLICATION

This application claims priority to and benefits of Chinese Patent Application Serial No. 201310108842.4, filed with the State Intellectual Property Office of P. R. China on Mar. 30, 2013, the entire content of which is incorporated herein by reference.

FIELD

Embodiments of the present disclosure generally relate to computer technology field, and more particularly to a method for positioning an IP location and a server.

BACKGROUND

Determining a geographic location of a computer according to an IP address of the computer has a wide range of applications, such as online advertisement, electronic commerce, application monitoring, network diagnosis, etc. Taking online advertisement as an example, if the websites can exactly determine a geographic location of a user according to an IP address of the user's computer, it is possible to display advertisement information near the user on the website such as cinemas near the community of the user, instead of displaying advertisement information that is not related with the user's location.

The conventional methods for positioning an IP location mainly comprise a method based on delay measurement and a method based on database. The method based on delay measurement comprises steps of: arranging a plurality of servers in different areas; measuring a network delay between each server and the IP location by these servers; and determining an actual distance between each server and the IP location according to the network delays. This method generally offers a precision ranging from 10 km to 40 km. However, as the method needs to arrange servers on a large scale, the cost of the method is comparatively high. Moreover, as a lot of network delays need to be measured, a response time ranging from dozens of seconds to a few minutes is needed for positioning the geographic location of an IP address. The method based on database stores the collected information such as IP registration information, domain name registration information and location information submitted by the user into the database and then determines the location of the IP address according to this information. This method has advantages of a short response time, as it only needs to query the database when the location of the IP address is required to be determined. However, as the precision of the collected data is low, the method may only achieve a precision above 70 km, which can only meet the precision requirements on city level.

Specifically, the method based on delay measurement comprises GeoPing, CBG, TBG, Octant, WangGeo, etc. GeoPing is the simplest method among them, which directly determines the location of the server with a shortest network delay between the server and a target IP to be the location of the IP address and has a positioning precision above 300 km. CBG estimates the corresponding distances between each server and the target IP according to the network delays between each server and the target IP, determines a possible area of the target IP according to each corresponding distance, and then uses the intersection of all the possible areas as the location of the target IP. The positioning precision of CBG is approximately 200 km. TBG and Octant further combine with the topological structure on the basis of CBG, so that the target IP is limited to a smaller area. The positioning precisions of TBG and Octant may reach 60 km and 35 km respectively. WangGeo does not only consider the network delay and the network topological structure, but also combines with the zip codes on the web page, so that the positioning precision of WangGeo can reach 7 to 10 km.

The method based on database determines the location of the IP address according to IP registration information, DNS information, location information submitted by the user, etc. For example, if a company in Beijing is found to register an IP address, then it can be determined that the IP address is in Beijing. If the corresponding domain name of this IP address is found to be "router-1.haidian.chinanet.cn", then the IP address may be determined to be in Haidian District of Beijing. Another method is based on the location information submitted by the users themselves. For example, the users may submit their IP addresses and related location information via a location sharing website.

The comparisons between conventional methods for positioning IP location are shown in Table 1. As shown in Table 1, it can be summarized as follows.

1. The method based on delay measurement has a long response time and a high deployment cost, and the highest positioning precision can reach up to 7 to 10 kilometers;

2. The method based on database has a short response time and a low deployment cost, but also a low positioning precision;

3. In the case of the application requirement of the online advertisement whose precision should be on a street level such as within 2 kilometer, neither the above two methods can meet the requirement.

TABLE 1 comparison of the conventional methods

| | method/product | data source | precision | response time | arrangement |
|---|---|---|---|---|---|
| method based on delay measurement | GeoPing | network delay | 300 km | dozens of seconds to a few minutes | hundreds of servers arranged in different areas |
| | CBG | network delay | 200 km | | |
| | TBG | network delay and topology | 60 km | | |
| | Octant | network delay and topology | 35 km | | |
| | WangGeo | network delay, topology and web zip code | 7-10 km | | |
| method based on database | IP138, IP.cn | IP registration, DNS, information submitted by the user | above 70 km | ignorable | ignorable |

SUMMARY

Embodiments of the present disclosure seek to solve at least one of the problems existing in the prior art to at least some extent.

One objective of the present disclosure is to provide a method for positioning an IP location, which may realize an IP positioning precision on a street level and have advantages of easy deployment and fast response speed.

Another objective of the present disclosure is to provide a server.

Yet another objective of the present disclosure is to provide a readable storage medium.

According to embodiments of a first aspect of the present disclosure, a method for positioning an IP location is provided. The method comprises steps of: obtaining location data of a plurality of mobile terminals used by a first plurality of users in a preset period to generate a first geographic location data set, in which the first geographic location data set comprises a first plurality of location data records and each of the first plurality of location data records comprises a first user identity, a first time and a geographic location; pre-processing the first geographic location data set to obtain a second geographic location data set; obtaining a second plurality of location data records of each of the first plurality of users in a first time period from the second geographic location data set, clustering the second plurality of location data records to obtain a plurality of first groups and computing a first center of each of the plurality of first groups to obtain a first selected location corresponding to each of the first plurality of users; obtaining a third plurality of location data records of each of the first plurality of users in a second time period from the second geographic location data set, clustering the third plurality of location data records to obtain a plurality of second groups and computing a second center of each of the plurality of second groups to obtain a second selected location corresponding to each of the first plurality of users; obtaining IP address data corresponding to a plurality of fixed terminals used by the first plurality of users in the preset period to generate an IP address data set, in which the IP address data set comprises a first plurality of IP address data records and each of the first plurality of IP address data records comprises a second user identity, a second time and an IP address; converting the IP addresses of the first plurality of IP address data records into a first plurality of IP sections, judging whether a number of IP address data records corresponding to each IP section is less than a first threshold, and if yes, deleting the IP address data records corresponding to the each IP section and a second plurality of IP sections are obtained; obtaining a second plurality of users corresponding to each of the second plurality of IP sections and computing the IP location corresponding to each of the second plurality of IP sections according to a plurality of first selected locations and a plurality of second selected locations corresponding to the second plurality of users.

In one embodiment of the present disclosure, pre-processing the first geographic location data set to obtain a second geographic location data set comprises steps of: obtaining an unprocessed user from the first geographic location data set; obtaining location data records of the unprocessed user from the first geographic location data set; judging whether a number of the location data records of the unprocessed user is less than a second threshold or greater than a third threshold; if the number of the location data records of the unprocessed user is less than the second threshold or greater than the third threshold, deleting the location data records of the unprocessed user from the first geographic location data set; judging whether there are other unprocessed users in the first geographic location data set; and if yes, repeating above steps until no unprocessed user exists in the first geographic location data set.

In one embodiment of the present disclosure, obtaining a first selected location and a second selected location corresponding to the first plurality of users comprises steps of: obtaining an unprocessed user from the second geographic location data set; obtaining the second plurality of location data records of the unprocessed user in the first time period, computing the first distance between each two location data records of the second plurality of location data records according to geographic locations in the second plurality of location data records, clustering the geographic locations in the second plurality of location data records according to the plurality of first distances to obtain the plurality of first groups of geographic locations, and computing the first center of each of the plurality of first groups of geographic locations to obtain a plurality of first centers as the first selected location of the unprocessed user; obtaining the third plurality of location data records of the unprocessed user in the second time period computing the second distance between each two location data records of the third plurality of location data records according to geographic locations in the third plurality of location data records, clustering the geographic locations in the third plurality of location data records according to the plurality of second distances to obtain the plurality of second groups of geographic locations, and computing the second center of each of the plurality of second groups of geographic locations to obtain the plurality of second centers as the second selected location of the unprocessed user; judging whether there are other unprocessed users in the second geographic location data set; and if yes, repeating above steps until no unprocessed user exists in the second geographic location data set.

In one embodiment of the present disclosure, computing the first distance between each two location data records of the second plurality of location data records comprises: converting the geographic locations in the second plurality of location data records into latitudes and longitudes, and converting the latitudes and longitudes into radians; and computing the first distance between the two location data records according to the formula $S=\arccos(\sin(\alpha_1)*\sin(\alpha_2)+\cos(\alpha_1)*\cos(\alpha_2)*\cos(\beta_1-\beta_2))*R$, in which S is the first distance, $[\alpha_1, \beta_1]$ is the radian of one of the two geographic locations, $[\alpha_2, \beta_2]$ is the radian of the other of the two geographic locations, and R is the radius of the earth; moreover, the first center of each of the plurality of first groups is $[(lat_1+lat_2+\ldots+lat_n)/n, (lng_1+lng_2+\ldots+lng_n)/n]$, in which $\{[lat_1,lng_1], [lat_2,lng_2], \ldots, [lat_n,lng_n]\}$ is a first group, $lat_i$ is the latitude of the geographic location in the second plurality of location data records, $lng_i$ is the longitude of the geographic location in the second plurality of location data records, n is a positive integer.

In one embodiment of the present disclosure, clustering the geographic locations in the second plurality of location data records according to a plurality of first distances comprises: judging whether a first distance is less than a fourth threshold; if yes, clustering two geographic locations related with the first distance; repeating the above steps until no first distance is less than the fourth threshold.

In one embodiment of the present disclosure, converting the IP addresses of the first plurality of IP address data records into a first plurality of IP sections comprises: leaving a first M bits of each IP address unchanged and setting the remaining 32-M bits of each IP address to 0 to get the first plurality of IP sections, in which M is an integer greater than 8 but less than 32.

In one embodiment of the present disclosure, computing the IP location corresponding to each of the second plurality of IP sections comprises: obtaining an unprocessed IP section from the second plurality of IP sections; obtaining the second plurality of users corresponding to the unprocessed IP section, obtaining the plurality of first selected locations and a plurality of second selected locations corresponding to the second plurality of users to be a plurality of selected locations corresponding to the unprocessed IP section, computing a plurality of fourth distances between each two selected locations of the plurality of selected locations and clustering the plurality of selected locations according to the plurality of fourth distances to obtain a first plurality of third groups of geographic locations; computing a center of one of the first plurality of third groups of geographic locations to be the IP location of the unprocessed IP section.

In one embodiment of the present disclosure, clustering the plurality of selected locations according to the plurality of fourth distances to obtain the first plurality of third groups of geographic locations comprises: judging whether a fourth distance is less than a fifth threshold; if yes, clustering two selected locations related with the fourth distance; repeating above steps until no fourth distance is less than the fifth threshold.

In one embodiment of the present disclosure, computing a center of one of the first plurality of third groups of geographic locations to be the IP location of the unprocessed IP section comprises: ranking the first plurality of third groups of geographic locations according to a number of selected locations in each of the first plurality of third groups of geographic locations to obtain a sequence $C_1, C_2, \ldots, C_i, \ldots, C_n$, in which n is a number of the first plurality of third groups of geographic locations; when the number of selected locations in $C_1$ is greater than the number of selected locations in $C_2$, making the center of $C_1$ to be the IP location; when the number of selected locations in $C_1$ is equal to the number of selected locations in choosing the third group comprising most users and making the center of the third group comprising the most users to be the IP location; and when the number of selected locations in $C_1$ is equal to the number of selected locations in $C_i$ and there are a second plurality of third groups comprising most users, randomly choosing one of the second plurality of third groups and making the center of the one of the second plurality of third groups to be the IP location.

In the present disclosure, the above preset time period may be any long period of time, such as one month or one year. The above threshold or selected number may be any values, the setting of these values will only effect the precision of results without effecting the method itself.

The method for positioning IP location according to the present disclosure is based on the fact that most people have regular daily activities, for example, people are usually at home in the first time period (for example, the night) and are usually in working places in the second time period (for example, the daytime). If location data of mobile terminals (such as mobile phones) used by users are collected (usually by GPS), then location data records of the users at night may be near their houses, and the location data records of the users in the daytime may be near their working places Thus, a possible geographic location of a certain user's house and a possible geographic location of a certain user's working place can be estimated according to these location data. Moreover, IP usage records of fixed terminals used by the users can be collected. If the collected IP usage records show that a certain IP section is used by fixed terminals of a plurality of users, this IP section is possibly in a geographic location where the houses and working places of these users gather.

The method for positioning the IP location according to embodiments of the present disclosure has at least one of the following features and advantages:

The present method indirectly estimates the geographic locations corresponding to the IP addresses of the fixed terminals (for example, PC at home, PC in the offices) and the servers according to the location data of the mobile terminals (such as, the mobile phone having a GPS positioning function) used by the user.

As the location data provided by the mobile phones has a high precision, an IP positioning precision at a street level may be achieved. Moreover, the method for positioning the IP location has advantageous of simple arrangement and fast response speed According to embodiments of a second aspect of the present disclosure, a server is provided. The server comprises: a first obtaining module, configured to obtain location data of a plurality of mobile terminals used by a first plurality of users in a preset period to generate a first geographic location data set, in which the first geographic location data set comprises a first plurality of location data records and each of the location data record comprises a first user identity, a first time and a geographic location; a first pre-processing module, configured to pre-process the first geographic location data set to obtain a second geographic location data set; a first clustering module, configured to obtain a second plurality of location data records of each of the first plurality of users in a first time period and a third plurality of location data records of each of the first plurality of users in a second time period from the second geographic location data set, to cluster the second plurality of location data records and the third plurality of location data records respectively to obtain a plurality of first groups and a plurality of second groups, and to compute a first center of each of the plurality of first groups and a second center of each of the plurality of second groups respectively to obtain a first selected location and a second selected location corresponding to each of the first plurality of users; a second obtaining module, configured to obtain IP address data corresponding to a plurality of fixed terminals used by the first plurality of users in the preset period to generate an IP address data set, in which the IP address data set comprises a first plurality of IP address data records and each of the first plurality of IP address data records comprises a second user IP identity, a second time and an IP address; a second pre-processing module, configured to convert the IP addresses of the first plurality of IP address data records into a first plurality of IP sections, to judge whether a number of IP address data records corresponding to each IP section is less than a first threshold, and to delete the IP address data records corresponding to the each IP section when the number of IP address data records corresponding to the each IP section is less than the first threshold so as to obtain a second plurality of IP sections; and a second clustering module, configured to obtain a second plurality of users corresponding to each of the second plurality of IP sections, and to compute the IP location corresponding to each of the second plurality of IP sections according to a plurality of first selected locations and a plurality of second selected locations corresponding to the second plurality of users.

In one embodiment of the present disclosure, the first pre-processing module is configured to: obtain an unprocessed user from the first geographic location data set; obtain location data records of the unprocessed user from the first geographic location data set; judge whether a number of the location data records of the unprocessed user is less than a second threshold or greater than a third threshold; if yes, delete the location data records of the unprocessed user from the first geographic location data set; judge whether there are other unprocessed users in the first geographic location data set, and if yes, repeat above steps until no unprocessed user exists in the second geographic location data set.

In one embodiment of the present disclosure, the first clustering module is configured to: obtain an unprocessed user from the second geographic location data set; obtain the second plurality of location data records of the unprocessed user in the first time period, compute a first distance between each two location data records of the second plurality of location data records according to geographic locations in the second plurality of location data records, cluster the geographic locations in the second plurality of location data records according to a plurality of first distances to obtain the plurality of first groups of geographic locations, and compute the first center of each of the plurality of first groups of geographic locations to obtain a plurality of first centers as the first selected location of the unprocessed user; obtain the third plurality of location data records of the unprocessed user in the second time period, compute a second distance between each two location data records of the third plurality of location data records according to geographic locations in the third plurality of location data record, cluster the geographic locations in the third plurality of location data records according to a plurality of second distances to obtain the plurality of second groups of geographic locations, and compute the second center of each of the plurality of second groups of geographic locations to obtain a plurality of second centers as the second selected location of the unprocessed user; judge whether there are other unprocessed users in the second geographic location data set; and if yes, repeat above steps until no unprocessed user exists in the second geographic location data set.

In one embodiment of the present disclosure, the first clustering module is configured to: convert the geographic locations in the second plurality of location data records into latitudes and longitudes, and convert the latitudes and longitudes into radians and compute the first distance between each two location data records according to the formula $S=\arccos(\sin(\alpha_1)*\sin(\alpha_2)+\cos(\alpha_1)*\cos(\alpha_2)*\cos(\beta_1-\beta_2))*R$, in which S is the first distance, $[\alpha_1, \beta_1]$ is the radian of one of the two geographic locations, $[\alpha_2, \beta_2]$ is the radian of the other of the two geographic locations, and R is the radius of the earth. The first center of each of the plurality of first groups is $[(lat_1+lat_2+\ldots+lat_n)/n, (lng_1+lng_2+\ldots+lng_n)/n]$, in which $\{[lat_1, lng_1], [lat_2, lng_2], \ldots, [lat_n, lng_n]\}$ is a first group, $lat_i$ is the latitude of the geographic location in the second plurality of location data records, $lng_i$ is the longitude of the geographic location in the second plurality of location data records, n is a positive integer.

In one embodiment of the present disclosure, the first clustering module is further configured to: judge whether a first distance is less than a fourth threshold; if yes, cluster two geographic locations related with the first distance; and repeat above steps until no first distance is less than the fourth threshold.

In one embodiment of the present disclosure, the second pre-processing module is configured to leave a first M bits of each IP address unchanged and set the remaining 32-M bits of each IP address to 0 to get the first plurality of IP sections, in which M is an integer greater than 8 but less than 32.

In one embodiment of the present disclosure, the second clustering module is configured to: obtain an unprocessed IP section from the second plurality of IP sections; obtain the second plurality of users corresponding to the unprocessed IP section, obtaining the plurality of first selected locations and a plurality of second selected locations corresponding to the second plurality of users to be a plurality of selected locations corresponding to the unprocessed IP section, computing a plurality of fourth distances between each two selected locations of the plurality of selected locations and clustering the plurality of selected locations according to the plurality of fourth distances to obtain a first plurality of third groups of geographic locations; and compute a center of one of the first plurality of third groups of geographic locations to be the IP location of the unprocessed IP section.

In one embodiment of the present disclosure, the second clustering module is further configured to: judge whether a fourth distance is less than a fifth threshold; if yes, cluster two selected locations related with the fourth distance; and repeat above steps until no fourth distance is less than the fifth threshold.

In one embodiment of the present disclosure, the second clustering module is further configured to: rank the first plurality of third groups of geographic locations according to a number of selected locations in each of the first plurality of third groups of geographic locations to obtain a sequence $C_1, C_2, \ldots, C_i, \ldots, C_n$, in which n is a number of the first plurality of third groups of geographic locations; when the number of selected locations in $C_1$ is greater than the number of selected locations in $C_2$, make the center of $C_1$ to be the IP location; when the number of selected locations in $C_1$ is equal to the number of selected locations in choosing the third group comprising most users and making the center of the third group comprising the most users to be the IP location, and when the number of selected locations in $C_1$ is equal to the number of selected locations in $C_i$ and there are a second plurality of third groups comprising most users, randomly choosing one of the second plurality of third groups and making the center of the one of the second plurality of third groups to be the IP location.

The server according to embodiments of the present disclosure has at least one of the following features and advantages:

The present server indirectly estimates the geographic locations corresponding to the IP addresses of the fixed terminals (for example, PC at home, PC in the offices) and the servers according to the location data of the mobile terminals (such as, the mobile phone having a GPS positioning function) used by the user.

As the location data provided by the mobile phones has a high precision, an IP positioning precision at a street level may be achieved. Moreover, the server according to the present disclosure has advantageous of simple arrangement and fast response speed.

According to embodiments of a third aspect of the present disclosure, a readable storage medium is provided. The readable storage medium comprises a computer program executing a method for positioning an IP location according to the first aspect of the present disclosure when run on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
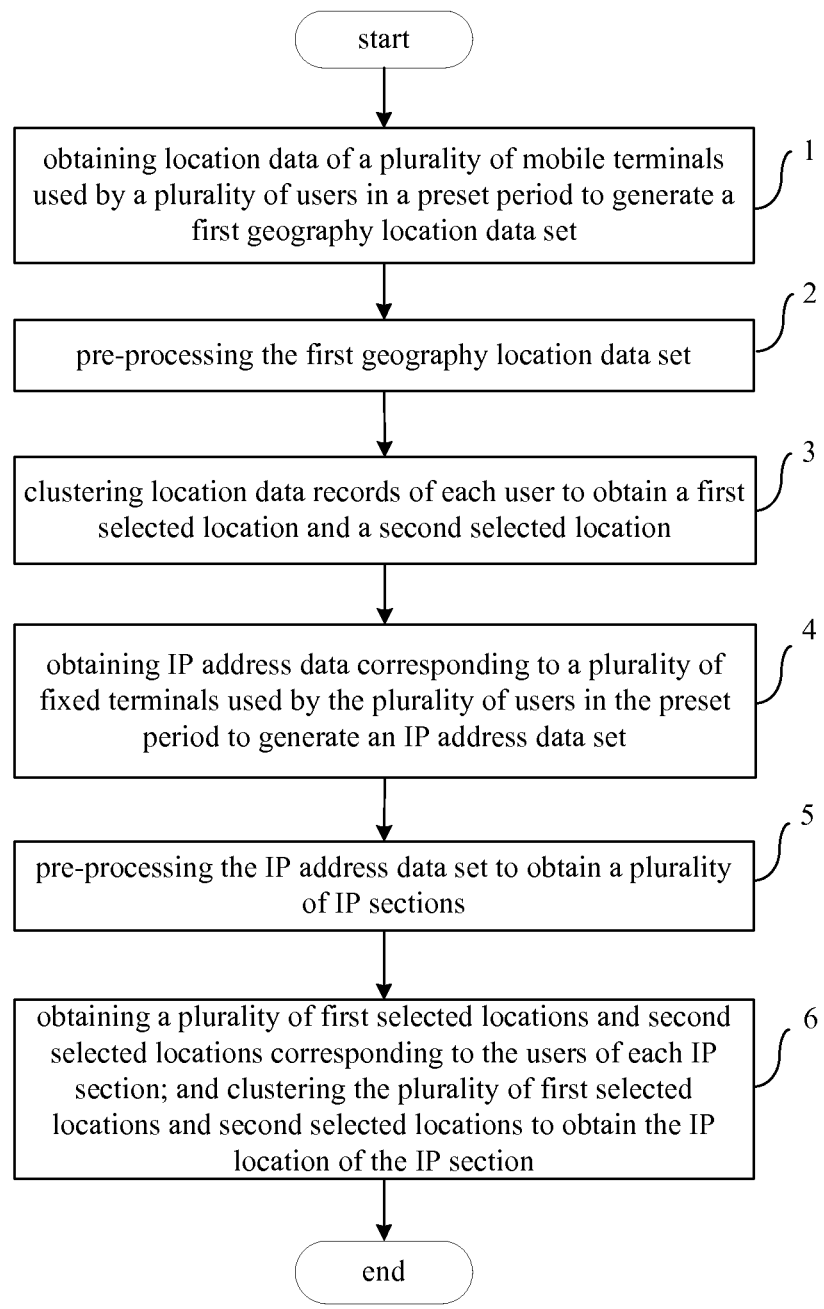
FIG. 1 is a flow chart of a method for positioning an IP location according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It is to be understood that, in the description of the present disclosure, terms of "first" and "second" are only used for description and cannot be seen as indicating or implying relative importance. Unless otherwise stipulated and restricted, it is to be explained that terms of "linkage" and "connection" shall be understood broadly, for example, it could be mechanical connection or electrical connection; it could be direct linkage, indirect linkage via intermediate medium. Those skilled in the art shall understand the concrete notations of the terms mentioned above according to specific circumstances. Furthermore, unless otherwise explained, it is to be understood that a term of "a plurality of" refers to two or more.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

In the following, the method for positioning an IP location according to embodiments of the present disclosure will be described in detail with reference to drawings.

In the present disclosure, for example, the location data of mobile terminals used by users are collected by instant messaging tools or social applications used by the users (such as, mobile QQ, mobile micro-blog, etc); and the IP address data of fixed terminals used by the users are collected by desktop QQ of Tencent. For example, when the users use applications such as the mobile QQ and mobile microblog of Tencent, they can submit their geographic location information by using functions such as "footprint", "speaking", etc. The geographic location information comprises login IDs of the users (i.e. the user identity described in the present method), submission time and geographic locations (latitude and longitude data collected by GPS). When the users login the desktop QQ of Tencent, the servers record the corresponding login information according to the data submitted by the user. The login information comprises the login ID of the user (the user identity), the login time and the login IP address. By using the above geographic location information submitted by the user and the login information of the desktop QQ, the geographic location data set and the IP address data set which are required by the present disclosure are obtained.

FIG. 1 is a flow char of a method for positioning an IP location according to an embodiment of the present disclosure. As shown in FIG. 1, the method comprises the following steps.

At step 1, location data of a plurality of mobile terminals used by a first plurality of users in a preset period (the period may be of any length, such as one month) is obtained to generate a first geographic location data set, in which the first geographic location data set comprises a first plurality of location data records and each of the first plurality of location data records comprises a first user identity, a first time and a geographic location.

In one embodiment of the present disclosure, the collected location data is latitude and longitude ([lat, lng]), and is stored into a MySQL database. The format of the location data record is shown in Table 2.

TABLE 2 the storage format of the location data of mobile terminals

| field | description | type | length | example |
|---|---|---|---|---|
| UID | user identity | character string | 20 bytes | liming1982 |
| Time | time | character string | 19 bytes | 2012-12-12 11:12:12 |
| Latitude | latitude | floating point number | 8 bytes | 46.339202 |
| Longitude | longitude | floating point number | 8 bytes | 121.393833 |

At step 2, the first geographic location data set is preprocessed to obtain a second geographic location data set.

Figure 2:
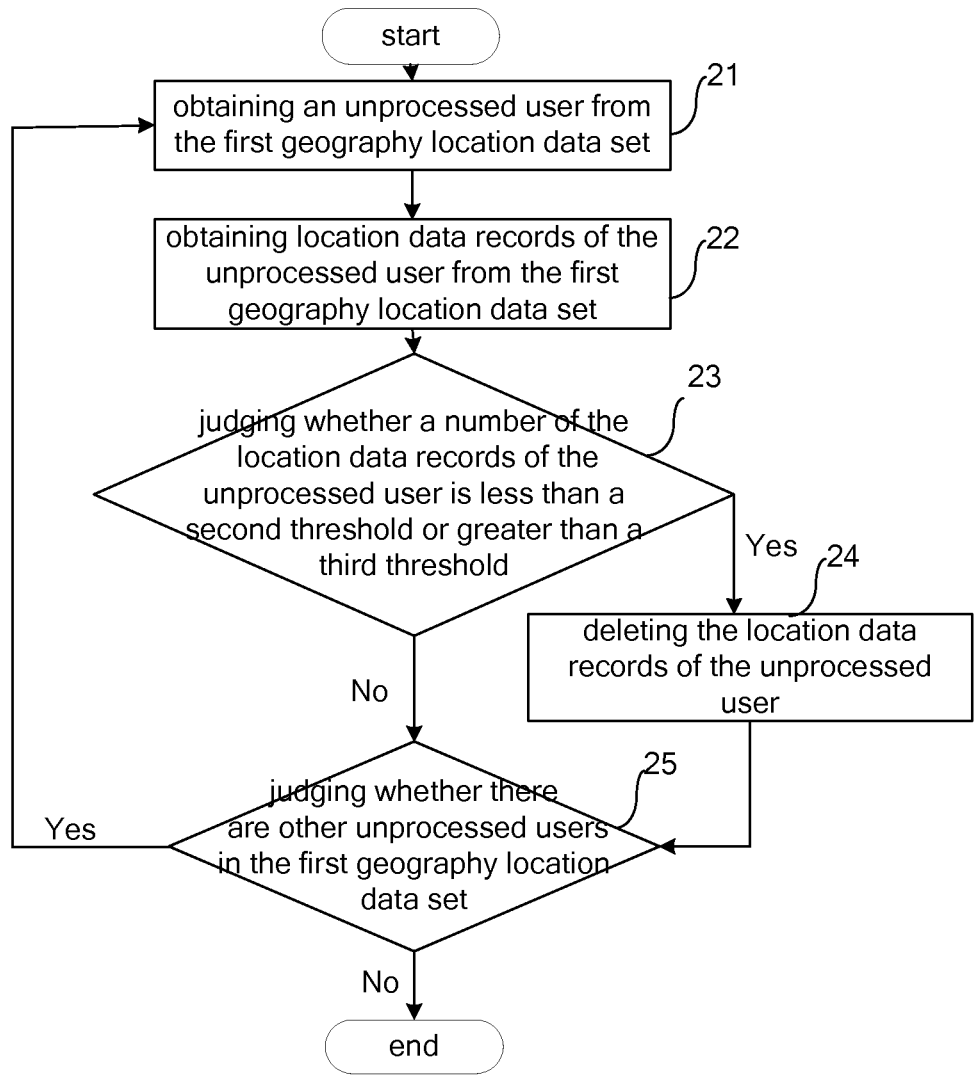
FIG. 2 is a flow chart of processing the first geographic location data set according to an embodiment of the present disclosure.

FIG. 2 is a flow chart of processing the first geographic location data set according to an embodiment of the present disclosure. As shown in FIG. 2, the step 2 comprises the following steps.

At step 21, an unprocessed user (user identity) is obtained from the first geographic location data set.

At step 22, the location data records of the unprocessed user are obtained from the first geographic location data set.

At step 23, it is judged whether a number of the location data records of the unprocessed user is less than a second threshold (the value of which may be set according to actual requirements and in this embodiment, the second threshold is set to be 10) or greater than a third threshold (the value of which may also be set according to actual requirements and in this embodiment, the third threshold is set to be 1000), and if yes, execute step 24.

At step 24, the location data records of the unprocessed user are deleted from the first geographic location data set.

At step 25, it is judged whether there are other unprocessed users in the first geographic location data set, and if yes, return to step 21 to repeat the above steps until no unprocessed user exists in the first geographic location data set.

At step 3, a second plurality of location data records of each of the first plurality of users in a first time period (for example, the night) are obtained from the second geographic location data set, the second plurality of location data records are clustered to obtain a plurality of first groups and a first center of each of the plurality of first groups is computed to obtain a first selected location corresponding to each of the first plurality of users; and a third plurality of location data records of each of the first plurality of users in a second time period (for example, the daytime) is obtained from the second geographic location data set, the third plurality of location records to obtain a plurality of second groups are clustered and a second center of each of the plurality of second groups is computed to obtain a second selected location corresponding to each of the first plurality of users.

In one embodiment of the present disclosure, the first selected location and the second selected location are stored in the MySQL database. The storage format of the first selected location and the second selected location is shown in Table 3.

TABLE 3 the storage format of the first selected location and the second selected location

| field | description | type | length | example |
|---|---|---|---|---|
| UID | user identity | character string | 20 bytes | liming1982 |
| Latitude | latitude of the selected location | floating point number | 8 bytes | 45.219393 |
| Longitude | longitude of the selected location | floating point number | 8 bytes | 120.293933 |
| Type | location type ("1" represents the first selected location, "0" represents the second selected location) | Boole | 1 bit | 1 |

Figure 3:
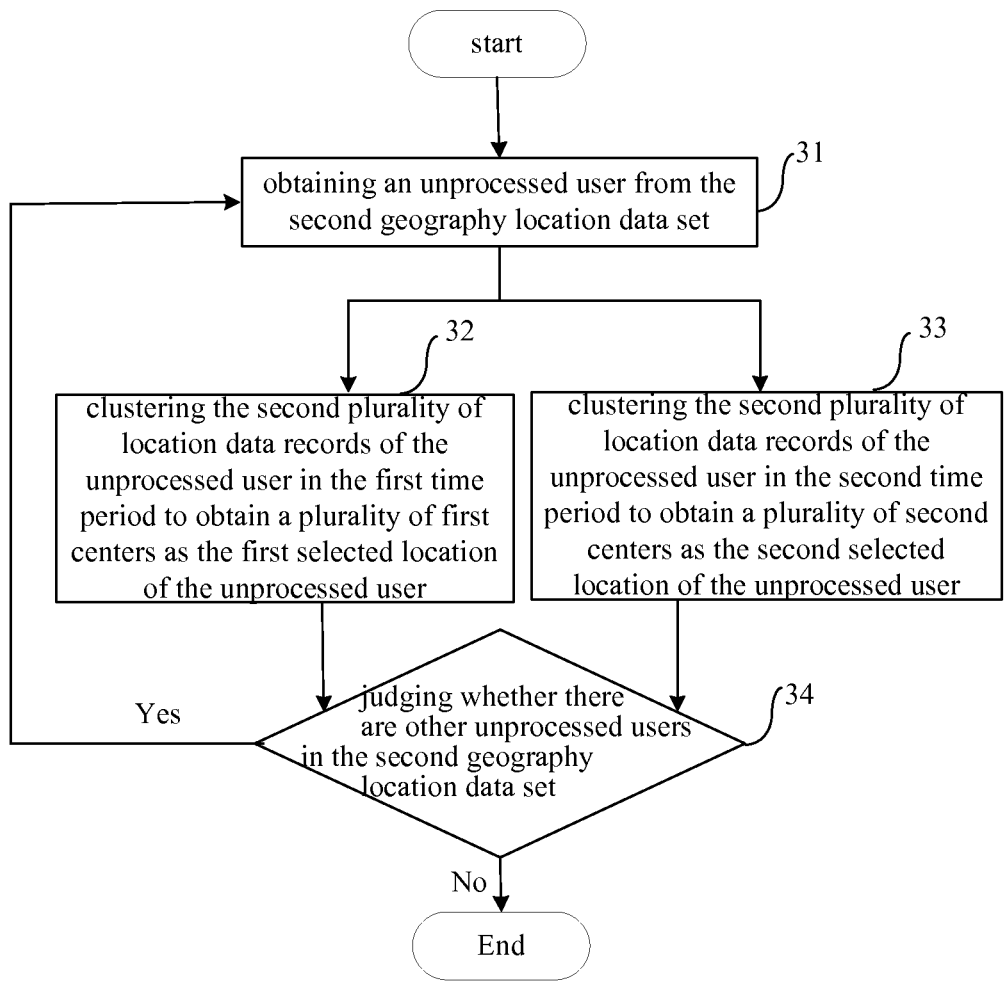
FIG. 3 is a flow chart of clustering location data records to obtain a first selected location and a second selected location according to an embodiment of the present disclosure.

FIG. 3 is a flow chart of clustering location data records to obtain a first selected location and a second selected location according to an embodiment of the present disclosure. As shown in FIG. 3, the step 3 comprises the following steps.

At step 31, an unprocessed user is obtained from the second geographic location data set.

At step 32, the second plurality of location data records of the unprocessed user in the first time period (in one embodiment, the first time period is from 8 p.m. to 7 a.m.), a first distance between each two location data records of the second plurality of location data records is computed according to geographic locations in the second plurality of location data records, the geographic locations in the second plurality of location data records are clustered according to a plurality of first distances to obtain the plurality of first groups of geographic location, and the first center of each of the plurality of first groups of geographic locations are computed to obtain a plurality of first centers as the first selected location of the unprocessed user.

Specifically, in one embodiment of the present disclosure, the distance between each two location data records of the second plurality of location data records are obtained as follows. Firstly, it is judged whether the geographic locations in the second plurality of location data records are latitudes and longitudes, if no, the geographic locations in the second plurality of location data records are converted into latitudes and longitudes. Then, the latitudes and longitudes are converted into radians. Finally, the first distance between each two location data records are computed according to the following formula, $$S=\arccos(\sin(\alpha_1)*\sin(\alpha_2)+\cos(\alpha_1)*\cos(\alpha_2)*\cos(\beta_1-\beta_2))*R,$$

in which S is the first distance, $[\alpha_1, \beta_1]$ is the radian of one of the two geographic locations, $[\alpha_2, \beta_2]$ is the radian of the other of the two geographic locations, and R is the radius of the earth (the default of R is 6378137.0 m).

Furthermore, the geographic locations in the second plurality of location data records are clustered as follows.

At step 321, it is judged whether a first distance is less than a fourth threshold, and if yes, execute step 322. In one embodiment, the fourth threshold is 200 m.

At step 322, two geographic locations related with the first distance are clustered to generate a cluster, in which the generated cluster comprises the longitudes and latitudes of the two geographic locations related with the first distance.

At step 323, a distance between each two generated clusters is computed, and then return to step 321 to judge whether the distance between two generated clusters is less than the fourth threshold, and if yes, the two generated clusters are clustered to generate a new cluster. In one embodiment, the distance between each two generated clusters (each generated cluster comprises at least one geographic location) is a maximum distance between any geographic location of one generated cluster and any geographic location of the other generated cluster. For example, assuming that one generated cluster comprises two geographic locations A and B, the other generated cluster comprises two geographic locations C and D, and the distance between A and C is larger than the distance between A and D, the distance between B and C and the distance B and D, and then the distance between A and C is used as the distance between the two generated clusters.

The above steps are repeated until the distance between each two clusters is less than the fourth threshold. Thus, the geographic locations in the second plurality of location data records are clustered into the plurality of first groups.

In one embodiment, assuming that a first group of geographic locations is $\{[lat_1, lng_1], [lat_2, lng_2], \ldots, [lat_n, lng_n]\}$, then the first center of the first group is $[(lat_1+lat_2+\ldots+lat_n)/n, (lng_1+lng_2+\ldots+lng_n)/n]$, in which $lat_i$ is the latitude of the geographic location in the second plurality of location data records, $lng_i$ is the longitude of the geographic location in the second plurality of location data records, and n is a positive integer.

At step 33, the third plurality of location data records of the unprocessed user in the second time period (in one embodiment, the second time period is from 9 a.m. to 6 p.m. on Monday to Friday), a second distance between each two location data records of the third plurality of location data records are computed according to geographic locations in the third plurality of location data records, the geographic locations in the third plurality of location data records are clustered according to the plurality of second distances to obtain the plurality of second groups of geographic locations, and the second center of each of the plurality of second groups of geographic locations is computed to obtain the plurality of second centers as the second selected location of the unprocessed user. The specific implementation of the step 33 is same as that of the step 32.

At step 34, it is judged whether there are other unprocessed users in the second geographic location data set, and if yes, return to the step 31 to repeat the above steps until no unprocessed user exists in the second geographic location data set.

At step 4, IP address data corresponding to a plurality of fixed terminals used by the first plurality of users in the preset period (the preset period may be of any length, such as one month) is obtained to generate an IP address data set, in which the IP address data set comprises a first plurality of IP address data records and each of the first plurality of IP address data records comprises a second user identity, a second time and an IP address. The IP address data set is stored in the MySQL data library. In one embodiment, the storage format of IP address data is as shown in Table 4.

TABLE 4 the storage format of the IP address data

| field | description | type | length | example |
|---|---|---|---|---|
| UID | user identity | character string | 20 bytes | liming1982 |
| Time | time | character string | 19 bytes | 2012-12-12 11:12:12 |
| IP | IP address | character string | 15 bytes | 166.111.193.233 |

At step 5, the IP addresses of the first plurality of IP address data records are converted into a first plurality of IP sections, and it is judged whether a number of IP address data records corresponding to each IP section is less than a first threshold (such as lower than 10), and if yes, the IP address data records corresponding to the each IP section are deleted and a second plurality of IP sections are obtained.

In one embodiment of the present disclosure, the IP addresses of the first plurality of IP address data records are converted into a first plurality of IP sections (in this embodiment, the IP address data of 166.111.120.13 is taken as an example for explanation) as follows.

At step 51, a length (M bits) of the IP address which requires to be remained is set, in which M is an integer lager than 8 but smaller than 32. In one embodiment, M is 24.

At step 52, the first M bits of each IP address are remained unchanged and the left 32-M bits of each IP address are set to 0 to get the first plurality of IP sections. In this embodiment, the first 24 bits are remained unchanged, and the left 8 bits are set to 0, such that the IP address 166.111.120.0 is converted into a corresponding IP section 166.111.120.13.

TABLE 5 the storage format of the converted IP section

| field | description | type | length | example |
|---|---|---|---|---|
| UID | user identity | character string | 20 bytes | liming1982 |
| Time | time | character string | 19 bytes | 2012-12-12 11:12:12 |
| IP section | IP section corresponding to the IP address | character string | 15 bytes | 166.111.193.233 |

At step 6, a second plurality of users corresponding to each of the second plurality of IP sections are obtained and the IP location corresponding to each of the second plurality of IP sections is computed according to a plurality of first selected locations and a plurality of second selected locations corresponding to the second plurality of users.

In one embodiment of the present disclosure, the step 6 may comprise the following steps.

At step 61, an unprocessed IP section is obtained from the second plurality of IP sections.

At step 62, the second plurality of users corresponding to the unprocessed IP section are obtained, the plurality of first selected locations and the plurality of second selected locations corresponding to the second plurality of users are obtained to be used as a plurality of selected locations corresponding to the unprocessed IP section, a plurality of fourth distances between each two selected locations of the plurality of selected locations are computed and the plurality of selected locations are clustered according to the plurality of fourth distances to obtain a first plurality of third groups of geographic locations.

In one embodiment of the present disclosure, clustering the plurality of second selected locations according to the plurality of fourth distances to obtain a first plurality of third groups of geographic locations comprises the following steps.

At step 621, it is judged whether a fourth distance is less than a fifth threshold.

At step 622, two selected locations related with the fourth distance are clustered to generate a cluster, in which the generated cluster comprises the longitudes and latitudes of the two selected locations related with the fourth distance.

At step 623, a distance between each two generated clusters is computed, and then return to step 623 to judge whether the distance between two generated clusters is less than the fifth threshold (500 m in this embodiment), and if yes, the two generated clusters are clustered to generate a new cluster. In one embodiment, similar to the above description, the distance between each two generated clusters is also a maximum distance between any selected location of one generated cluster and any selected location of the other generated cluster.

The above steps are repeated until the distance between each two clusters is less than the fourth threshold. Thus, the plurality of selected locations are clustered into the first plurality of third groups of geographic locations.

At step 63, a center of one of the first plurality of third groups of geographic locations is computed to be the IP location of the unprocessed IP section.

In one embodiment of the disclosure, computing a center of one of the first plurality of third groups of geographic locations to be the IP location of the unprocessed IP section comprises the following steps.

At step 631, the first plurality of third groups of geographic locations are ranked according to a number of selected locations in each of the first plurality of third groups of geographic locations to obtain a sequence $C_1, C_2, \ldots, C_i, \ldots, C_n$, in which n is a number of the first plurality of third groups of geographic locations.

At step 632, when the number of selected locations in $C_1$ is greater than the number of selected locations in $C_2$, the center of $C_1$ is made to be the IP location.

At step 633, when the number of selected locations in $C_1$ is equal to the number of selected locations in $C_i$, the third group comprising most users is chosen and the center of the third group comprising the most users are made to be the IP location.

At step 634, when the number of number of selected locations in $C_1$ is equal to the number of selected locations in $C_i$ and there are a second plurality of third groups comprising most users, one of the second plurality of third groups is randomly chosen and the center of the one of the second plurality of third groups is made to be the IP location.

The present disclosure also provides a server.

Figure 4:
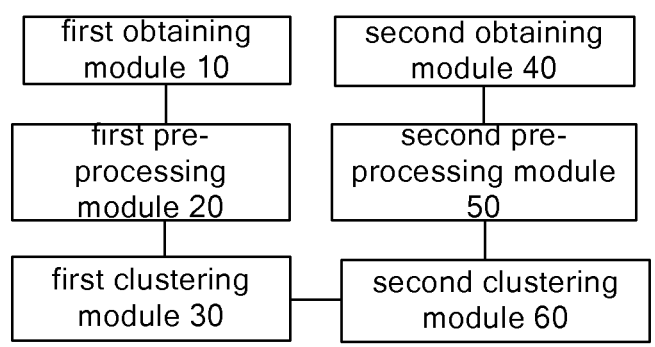
FIG. 4 is block diagram of a server according to an embodiment of the present disclosure.

FIG. 4 is block diagram of a server according to an embodiment of the present disclosure. As show in FIG. 4, the server comprises a first obtaining module 10, a first pre-processing module 20, a first clustering module 30, a second obtaining module 40, a second pre-processing module 50 and a second clustering module 60.

Specifically, the first obtaining module 10 is configured to obtain location data of a plurality of mobile terminals used by a first plurality of users in a preset period (the preset period may be of any length, such as one month) to generate a first geographic location data set, in which the first geographic location data set comprises a first plurality of location data records and each of the location data record comprises a first user identity, a first time and a geographic location. In one embodiment of the present disclosure, the location data is latitude and longitude ([lat, lng]) and the collected location data are stored in the MySQL database. The specific format of the location data record is as shown in the above Table 2.

The first pre-processing module 20 is configured to pre-process the first geographic location data set to obtain a second geographic location data set.

In one embodiment of the present disclosure, the first pre-processing module 20 is specifically configured to execute the following steps in order to obtain the second geographic location data set. Firstly, an unprocessed user (user identity) is obtained from the first geographic location data set. Then, location data records of the unprocessed user are obtained from the first geographic location data set. Subsequently, the first pre-processing module 20 judges whether a number of the location data records of the unprocessed user is less than a second threshold (the value of which may be set according to actual requirements and in this embodiment, the second threshold is set to be 10) or greater than a third threshold (the value of which may also be set according to actual requirements and in this embodiment, the third threshold is set to be 1000), and if yes, the first pre-processing module 20 deletes the location data records of the unprocessed user from the first geographic location data set. Then, the first pre-processing module 20 judges whether there are other unprocessed users in the first geographic location data set, and if yes, repeat the above steps until no unprocessed user exists in the first geographic location data set.

The first clustering module 30 is configured to obtain a second plurality of location data records of each of the first plurality of users in a first time period (at night) and third plurality of location data records of each of the first plurality of users in a second time period (during day), to cluster the second plurality of location data records and the third plurality of location data records respectively to obtain a plurality of first groups and a plurality of second groups, and to compute a first center of each of the plurality of first groups and a second center of each of the plurality of second groups respectively to obtain a first selected location and a second selected location corresponding to each of the first plurality of users. In one embodiment of the present disclosure, the first selected location and the second selected location of the user are stored in the MySQL database, and the specific storage format of the first selected location and the second selected location have already been shown in Table 3.

In one embodiment of the present disclosure, the first clustering module 30 is specifically configured to execute the following steps to obtain the first selected location and the second selected location corresponding to the first plurality of users. Firstly, the first clustering module obtains an unprocessed user from the second geographic location data set. Then, the first clustering module obtains the second plurality of location data records of the unprocessed user in the first time period (in one embodiment, the first time period is from 8 p.m. to 7 a.m.), computes a first distance between each two location data records of the second plurality of location data records according to geographic locations in the second plurality of location data records, clusters the geographic locations in the second plurality of location data records according to a plurality of first distances to obtain the plurality of first groups of geographic location, and computes the first center of each of the plurality of first groups of geographic locations to obtain a plurality of first centers as the first selected location of the unprocessed user. Simultaneously or subsequently, the first clustering module 30 obtains the third plurality of location data records of the unprocessed user in the second time period, computes a second distance between each two location data records of the third plurality of location data records according to geographic locations in the third plurality of location data records, clusters the geographic locations in the third plurality of location data records according to a plurality of second distances to obtain the plurality of second groups of geographic locations, and computes the second center of each of the plurality of second groups of geographic locations to obtain a plurality of second centers as the second selected location of the unprocessed user. Then, the first clustering module 30 judges whether there are other unprocessed users in the second geographic location data set, and if yes, repeats the above steps until no unprocessed user exists in the second geographic location data set.

In one embodiment of the present disclosure, the first clustering module 30 judges whether the geographic locations in the second plurality of location data records are latitudes and longitudes, if no, the first clustering module 30 converts the geographic locations in the second plurality of location data records into latitudes and longitudes and converts the latitudes and longitudes into radians. Then, the first clustering module 30 computes the first distance between each two location data records according to the following formula, $$S = \arcos(\sin(\alpha_1)*\sin(\alpha_2)+\cos(\alpha_1)*\cos(\alpha_2)*\cos(\beta_1-\beta_2))*R,$$

in which, S is the first distance, $[\alpha_1, \beta_1]$ is the radian of one of the two geographic locations, $[\alpha_2, \beta_2]$ is the radian of the other of the two geographic locations, and R is the radius of the earth (the default of R is 6378137.0 m).

In another embodiment of the present disclosure, the first clustering module 30 further judges whether a first distance is less than a fourth threshold, and if yes, the first clustering module 30 clusters two geographic locations related with the first distance less than the fourth threshold to generate a cluster. Then, the first clustering module 30 computes a distance between each two generated clusters. In one embodiment, the distance between each two generated cluster is a maximum distance between any geographic location of one generated cluster and any geographic location of the other generated cluster. Then, the first clustering module 30 judges whether the distance between two generated clusters is less than the fourth threshold, and if yes, it clusters the two generated clusters to generate a new cluster and so on until the plurality of first groups of geographic locations are obtained. The method of obtaining the plurality of second groups of geographic locations is similar to the above manner.

In one embodiment of the present disclosure, the first center of each of the plurality of first groups $[(lat_1+lat_2+\ldots+lat_n)/n, (lng_1+lng_2+\ldots+lng_n)/n]$, in which $\{[lat_1, lng_1], [lat_2,lng_2], \ldots, [lat_n,lng_n]\}$ is a first group, $lat_i$ is the latitude of the geographic location in the second plurality of location data records, $lng_i$ is the longitude of the geographic location in the second plurality of location data records, n is a positive integer. The second center of each of the plurality of second groups may also be computed as the above formula.

The second obtaining module 40 is configured to obtain IP address data corresponding to a plurality of fixed terminals used by the first plurality of users in the preset period (the period may be any length, such as one month) to generate an IP address data set, wherein the IP address data set comprises a first plurality of IP address data records and each of the first plurality of IP address data records comprises a second user identity, a second time and an IP address. In one embodiment of the present disclosure, the IP address data set is stored in the MySQL database, and the format of IP address data has already been shown in Table 4.

The second pre-processing module 50 is configured to convert the IP addresses of the first plurality of IP address data records into a first plurality of IP sections, to judge whether a number of IP address data records corresponding to each IP section is less than a first threshold (such as lower than 10), and if yes, to delete the IP address data records corresponding to the each IP section and thus a second plurality of IP sections are obtained.

In one embodiment of the present disclosure, the second pre-processing module 50 is specifically configured to execute the following steps in order to convert the IP addresses of the first plurality of IP address data records into a first plurality of IP sections. Firstly, a length (M bits, and M is an integer larger than 8 but smaller than 32) of the IP address which requires to be remained is set, and then a first M bits of the each IP address are remained unchanged and the left 32-M bits of each IP address are set to 0 to get the first plurality of IP sections. In one embodiment, the first 24 bits are remained unchanged and the left 8 bits are set to 0, such that an IP address 166.111.120.13 is converted into a corresponding IP section 166.111.120.0.

The second clustering module 60 is configured to obtain a second plurality of users corresponding to each of the second plurality of IP sections and to compute the IP location corresponding to each of the second plurality of IP sections according to a plurality of first selected locations and a plurality of second selected locations corresponding to the second plurality of users.

In one embodiment of the present disclosure, the second clustering module 60 is specifically configured to execute the following steps to obtain IP locations corresponding to the second plurality of users. Firstly, an unprocessed IP section is obtained from the second plurality of IP sections. Then, the second plurality of users corresponding to the unprocessed IP section is obtained, the plurality of first selected locations and the plurality of second selected locations are obtained (according to results of the first clustering module 30), a plurality of fourth distances between each two selected locations of the plurality of selected locations are computed and the plurality of selected locations are clustered according to the plurality of fourth distances to obtain a first plurality of third groups of geographic locations. Subsequently, a center of one of the first plurality of third group of geographic locations is computed to be the IP location of the unprocessed IP section. The above steps are repeated until no unprocessed IP section exists in the second plurality of IP sections.

In one embodiment of the present disclosure, the second clustering module 60 is specifically configured to execute the following steps in order to obtain a first plurality of third groups of geographic locations. Firstly, the second clustering module 60 judges whether a fourth distance is less than a fifth threshold (500 m in this embodiment), and if yes, the second clustering module 60 clusters two selected locations related with the fourth distance less than the fifth threshold to generate a cluster. Then, the second clustering module 60 computes a distance between each two generated clusters. In one embodiment, the distance between each two generated clusters is a maximum distance between any selected location of one generated cluster and any selected location of the other generated cluster. Then, the second clustering module 60 judges whether the distance between two generated clusters is less than the fifth threshold, and if yes, it clusters the two generated clusters to generate a new cluster, and so on until the first plurality of third groups are obtained.

In another embodiment of the disclosure, the second clustering module 60 is specifically configured to execute the following steps in order to compute a center of one of the first plurality of third groups of geographic locations to be the IP location of the unprocessed IP section. Firstly, the first plurality of third groups of geographic locations are ranked according to a number of selected locations in each of the first plurality of third groups of geographic locations to obtain a sequence $C_1, C_2, \ldots, C_i, \ldots, C_n$, in which n is a number of the first plurality of third groups of geographic locations. When the number of selected locations in $C_1$ is greater than the number of selected locations in $C_2$, the center of $C_1$ is made to be the IP location. When the number of selected locations in $C_1$ is equal to the number of selected locations in the third group comprising most users is chosen and the center of the third group comprising the most users is made to be the IP location. When the number of selected locations in $C_1$ is equal to the number of selected locations in $C_i$ and there are a second plurality of third groups comprising most users, one of the second plurality of third groups is randomly chosen and the center of the one of the second plurality of third groups is made to be the IP location.

The server according to embodiments of the present disclosure has at least one of the following features and advantages:

The present server estimates the geographic locations corresponding to the IP addresses of the fixed terminals (for example, PC at home, PC in the offices) and of the servers according to the location data of the mobile terminals (such as, the mobile phone having a GPS positioning function) used by the user.

As the location data provided by the mobile phones has a high precision, an IP positioning precision on a street level may be achieved. Moreover, the server according to the present disclosure has advantageous of simple arrangement and fast response speed.

The present disclosure also provides a readable storage medium. The readable storage medium comprises a computer program for executing the method for positioning the IP location according to embodiments of the present disclosure when run on a computer.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in a electric manner, and then the programs may be stored in the computer memories.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as an standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for positioning an Internet Protocol ("IP") location, comprising steps of:
    obtaining location data of a plurality of mobile terminals used by a first plurality of users in a preset period to generate a first geographic location data set, wherein the first geographic location data set comprises a first plurality of location data records and each of the first plurality of location data records comprises a first user identity, a first time and a geographic location;
    pre-processing the first geographic location data set to obtain a second geographic location data set;
    obtaining a second plurality of location data records of each of the first plurality of users in a first time period from the second geographic location data set, clustering the second plurality of location data records to obtain a plurality of first groups and computing a first center of each of the plurality of first groups to obtain a first selected location corresponding to each of the first plurality of users;
    obtaining a third plurality of location data records of each of the first plurality of users in a second time period from the second geographic location data set, clustering the third plurality of location data records to obtain a plurality of second groups and computing a second center of each of the plurality of second groups to obtain a second selected location corresponding to each of the first plurality of users;
    obtaining IP address data corresponding to a plurality of fixed terminals used by the first plurality of users in the preset period to generate an IP address data set, wherein the IP address data set comprises a first plurality of IP address data records and each of the first plurality of IP address data records comprises a second user identity, a second time and an IP address;
    converting the IP addresses of the first plurality of IP address data records into a first plurality of IP sections, judging whether a number of IP address data records corresponding to each IP section is less than a first threshold, and if yes, deleting the IP address data records corresponding to the each IP section and a second plurality of IP sections are obtained; and
    obtaining a second plurality of users corresponding to each of the second plurality of IP sections and computing the IP location corresponding to each of the second plurality of IP sections according to a plurality of first selected locations and a plurality of second selected locations corresponding to the second plurality of users.

2. The method according to claim 1, wherein pre-processing the first geographic location data set to obtain a second geographic location data set comprises:
    obtaining an unprocessed user from the first geographic location data set;
    obtaining location data records of the unprocessed user from the first geographic location data set;
    judging whether a number of the location data records of the unprocessed user is less than a second threshold or greater than a third threshold;
    if yes, deleting the location data records of the unprocessed user from the first geographic location data set;
    judging whether there are other unprocessed users in the first geographic location data set; and
    if yes, repeating above steps until no unprocessed user exists in the first geographic location data set.

3. The method according to claim 1, wherein obtaining a first selected location and a second selected location corresponding to each of the first plurality of users comprises:
    obtaining an unprocessed user from the second geographic location data set;
    obtaining the second plurality of location data records of the unprocessed user in the first time period, computing a first distance between each two location data records of the second plurality of location data records according to geographic locations in the second plurality of location data records according to geographic locations in the second plurality of location data records, clustering the geographic locations in the second plurality of location data records according to a plurality of first distances to obtain the plurality of first groups of geographic locations, and computing the first center of each of the plurality of first groups of geographic locations to obtain a plurality of first centers as the first selected location of the unprocessed user;

obtaining the third plurality of location data records of the unprocessed user in the second time period, computing a second distance between each two location data records of the third plurality of location data records according to geographic locations in the third plurality of location data records, clustering the geographic locations in the third plurality of location data records according to a plurality of second distances to obtain the plurality of second groups of geographic locations, and computing the second center of each of the plurality of second groups of geographic locations to obtain a plurality of second centers as the second selected location of the unprocessed user;

judging whether there are other unprocessed users in the second geographic location data set; and if yes, repeating above steps until no unprocessed user exists in the second geographic location data set.

4. The method according to claim 3, wherein computing the first distance between each two location data records comprises:

converting the geographic locations in the second plurality of location data records into latitudes and longitudes, and converting the latitudes and longitudes into radians; and computing the first distance between each two location data records according to the following formula, $$S = \arccos(\sin(\alpha_1)*\sin(\alpha_2) + \cos(\alpha_1)*\cos(\alpha_2)*\cos(\beta_1 - \beta_2))*R$$

in which, S is the first distance, $[\alpha_1, \beta_1]$ is the radian of one of the two geographic locations, $[\alpha_2, \beta_2]$ is the radian of the other of the two geographic locations, and R is the radius of the earth, wherein, the first center of each of the plurality of first groups is $[(lat_1+lat_2+\ldots+lat_n)/n, (lng_1+lng_2+\ldots+lng_n)/n]$, in which $\{[lat_1,lng_1], [lat_2,lng_2], \ldots, [lat_n,lng_n]\}$ is a first group, $lat_i$ is the latitude of the geographic location in the second plurality of location data records, $lng_i$ is the longitude of the geographic location in the second plurality of location data records, n is a positive integer.

5. The method according to claim 3, wherein clustering the geographic locations in the second plurality of location data records according to a plurality of first distances comprises:

judging whether a first distance is less than a fourth threshold;

if yes, clustering two geographic locations related with the first distance;

repeating above steps until no first distance is less than the fourth threshold.

6. The method according to claim 1, wherein converting the IP addresses of the first plurality of IP address data records into a first plurality of IP sections comprises:

leaving the first M bits of each IP address unchanged and setting remaining 32-M bits of each IP address to 0 to get the first plurality of IP sections, in which M is an integer greater than 8 but less than 32.

7. The method according to claim 1, wherein computing the IP location corresponding to each of the second plurality of IP sections comprises:

obtaining an unprocessed IP section from the second plurality of IP sections;

obtaining the second plurality of users corresponding to the unprocessed IP section, obtaining the plurality of first selected locations and the plurality of second selected locations corresponding to the second plurality of users to be a plurality of selected locations corresponding to the unprocessed IP section, computing a plurality of fourth distances between each two selected locations of the plurality of selected locations and clustering the plurality of selected locations according to the plurality of fourth distances to obtain a first plurality of third groups of geographic locations;

computing the center of one of the first plurality of third groups of geographic locations to be the IP location of the unprocessed IP section.

8. The method according to claim 7, wherein clustering the plurality of selected locations according to the plurality of fourth distances comprises:

judging whether a fourth distance is less than a fifth threshold;

if yes, clustering two selected locations related with the fourth distance;

repeating above steps until no fourth distance is less than the fifth threshold.

9. The method according to claim 7, wherein computing a center of one of the first plurality of third groups of geographic locations to be the IP location of the unprocessed IP section comprises:

ranking the first plurality of third groups of geographic locations according to a number of selected locations in each of the first plurality of third groups of geographic locations to obtain a sequence $C_1, C_2, \ldots, C_i, \ldots, C_n$, in which n is a number of the first plurality of third groups of geographic locations;

when the number of selected locations in $C_1$ is greater than the number of selected locations in $C_2$, making the center of $C_1$ to be the IP location;

when the number of selected locations in $C_1$ is equal to the number of selected locations in $C_i$, choosing the third group comprising most users and making the center of the third group comprising the most users to be the IP location; and when the number of selected locations in $C_1$ is equal to the number of selected locations in $C_i$ and there are a second plurality of third groups comprising most users, randomly choosing one of the second plurality of third groups and making the center of the one of the second plurality of third groups to be the IP location.

* * * * *